United States Patent [19]

Greeson

[11] Patent Number: 4,977,938

[45] Date of Patent: Dec. 18, 1990

[54] CUTTING GUIDE FOR PORTABLE ROUTER

[76] Inventor: Ewell E. Greeson, 3801 Maryland Dr., Doraville, Ga. 30340

[21] Appl. No.: 352,406

[22] Filed: May 16, 1989

[51] Int. Cl.$^5$ .............................................. B27C 5/10
[52] U.S. Cl. .......................... 144/134 D; 144/136 C; 144/253 G; 144/253 J; 409/178; 409/182; 83/574; 83/745
[58] Field of Search .......... 144/134 D, 136 C, 253 G, 144/253 J; 409/175, 178, 180, 181, 182; 83/745, 574, 581

[56] References Cited

U.S. PATENT DOCUMENTS

| | | | |
|---|---|---|---|
| 2,705,032 | 3/1955 | Pearson | 144/136 C |
| 3,955,607 | 5/1976 | Roche | 144/134 D |
| 4,186,784 | 2/1980 | Stone | 83/574 X |
| 4,290,464 | 9/1981 | Marsan | 144/136 C |
| 4,353,672 | 10/1982 | Smith | 144/134 D X |
| 4,572,715 | 2/1986 | Wolff | 409/180 |
| 4,591,305 | 5/1986 | Bergler | 409/175 |
| 4,608,898 | 9/1986 | Volk | 83/745 |
| 4,640,324 | 2/1987 | Lounds | 144/134 D |
| 4,655,653 | 4/1987 | Hall et al. | 409/182 |

FOREIGN PATENT DOCUMENTS

1367242 9/1974 United Kingdom ............ 144/136 C

Primary Examiner—Hien H. Phan
Assistant Examiner—Eugenia A. Jones
Attorney, Agent, or Firm—Michael V. Drew

[57] ABSTRACT

A cutting guide for hand-held routers has a guide fence which pivots about a base. The guide fence engages a workpiece and provides a steady support for a variety of routing operations including bevelling or chamfering, splining, rabbeting, dadoing and edging. The cutting guide also has an after-cut guide to provide additional support.

16 Claims, 7 Drawing Sheets

Fig_1A

_Fig_5A

_Fig_5B  _Fig_5D

_Fig_5C

Fig_8

CUTTING GUIDE FOR PORTABLE ROUTER

TECHNICAL FIELD

This invention relates to cutting guides for use with power tools, and more specifically, cutting guides for use with hand-held, or portable, routers.

BACKGROUND OF THE INVENTION

Hand-held power tools, such as routers, are useful in woodworking because they are more versatile than table-mounted or fixed, stationary power tools. Hand-held power tools can be used on virtually any type of workpiece. They perform well on workpieces that are generally worked by table-mounted or stationary tools and, in addition, those workpieces that cannot be accomodated by table-mounted or stationary tools because of the size or configuration of the workpiece. The hand-held power tool is especially useful on workpieces that when worked using a table-mounted or stationary power tool require two or more operators to manipulate the workpiece. A hand-held power tool can normally make the same cuts through the efforts of only one operator.

One problem with hand-held power tools is that it is difficult to guide some tools to create cuts as precise and accurate as those which can be made with table-mounted power tools. If it were possible to precisely and accurately guide the hand-held power tool, its use would offer substantial advantages over stationary or table-mounted tools. The cost of the hand-held tool is substantially less than a stationary, table-mounted apparatus. The freedom of movement of the hand-held tool allows work to be performed by one individual on workpieces that would normally require manipulation by at least two individuals using a table-mounted power tool. Also, workpieces that cannot be mounted upon a worktable because of their configuration or size must be worked upon by using a hand-held power tool. However, in this last instance, the hand-held tool must still be carefully guided to produce cuts as precise and accurate as those made by stationary or table-mounted tools.

Routers are popular hand-held tools that have several uses. They can be used for cutting the edges of a workpiece at an angle, which is known as bevelling or chamfering. Bevelling the edge of a workpiece is generally done with a special router blade, a "set-angle" bit, that cuts at a fixed angle as the axis of the router blade maintains a vertical alignment perpendicular to the workpiece. A router blade which is capable of making cuts in this manner only cuts at the angle for which the blade is configured. It would be necessary to use a different router blade for each angular setting desired. For example, if a router blade is configured to bevel an edge of a workpiece at a 45° angle, a different router blade would have to be used for each angle other than 45° which is desired to be cut. Further, when a "set-angle" bit is used, the workman has to also use a straightedge, bits that will cut the same angle at varying depths and/or other devices to compensate for the thickness of the workpiece in order to attain the desired depth of cut. The straightedge would have to be clamped onto the workpiece or base of the router to control the depth of cut.

Another woodworking function of routers is the cutting of splines, dados, shiplaps and rabbets to facilitate the joining of workpieces. A problem with hand-held routers is that these types of cuts cannot be made without the use of a guide. Router operators currently use make-shift guides, which have limited reliability and versatility, or commericial guides that have limited versatility. It is imperative that these cuts be made precisely and accurately. Thus, a versatile, reliable guide is essential for this function. In instances where it is necessary to make a cut such as a spline in the surface of a workpiece which has been cut at an angle, the use of a reliable guide becomes even more important.

The router is also used for performing the woodworking function called edging wherein there are two workpieces which have been joined together and it is necessary to remove material from one workpiece (the edge-piece) to make its surface even with that of the second workpiece. The cut made by the router must be precisely guided to create a smooth cut close to the surface of the second workpiece without damaging the second workpiece.

During edging, the second surface serves as both the measure of the desired level to be attained and the support surface for guiding the router. When the second surface is a finished surface, care must be taken not to mar it as it serves as the measure for the depth of cut and a support surface.

The need to compensate for the thickness of the workpiece has been noted above with respect to cutting angles. However, in performing all of the aforementioned woodworking functions the thickness of the wood is a factor that has to be taken into consideration. Very often, the exact positioning of the router bit in proximity to the workpiece is dependent upon the thickness of the workpiece.

There does not appear to be an apparatus available for for addressing the needs set forth above.

Accordingly, it will be seen that it is desirable to have a cutting guide which will enable users of hand-held routers to make precise, accurate cuts on a workpiece.

Accordingly, it will be seen that it is desirable to have a cutting guide which will enable users of hand-held routers to make precise, accurate cuts on a workpiece at selected angles.

Accordingly, it will be seen that it is desirable to have a cutting guide which will enable users of hand-held routers to precisely and accurately cut splines, dados, shiplaps and rabbets.

Accordingly, it will be seen that it is desirable to have a cutting guide which will enable users of hand-held routers to precisely and accurately cut splines, dados, shiplaps and rabbets at angles in workpieces.

Accordingly, it will be seen that it is desirable to have a cutting guide which will enable users of hand-held routers to precisely and accurately cut splines, dados, shiplaps and rabbets in the cut surface of workpieces which have been cut at an angle.

Accordingly, it will be seen that it is desirable to have a cutting guide which will enable users of hand-held routers to precisely and accurately perform edging on workpieces.

Accordingly, it will be seen that it is desirable to have a cutting guide which will enable users of hand-held routers to precisely and accurately perform edging on workpieces without maring the surface of a finished workpiece.

Accordingly, it will be seen that it is desirable to have a cutting guide which will enable users of hand-held routers to perform the above-noted functions on workpieces of varying thicknesses.

Accordingly, it will be seen that it is desirable to have a single cutting guide incorporating all of the above features.

SUMMARY OF THE INVENTION

The present invention is directed to addressing the needs and overcoming the problems set forth above. Briefly summarized, according to one aspect of the invention, a guide fence is connected by a hinge to the bottom of a base. A mounting plate, upon which the router is mounted, is fitted upon the upper surface of the base. A workpiece would be engaged by the guide fence before it is cut by the bit of the router, thus creating a steady support as the router is moved across the workpiece.

The guide fence is able to pivot about the base and be held at an acute angle or a right angle, with respect to the bottom surface of the base. The position of the mounting plate, to which the router is affixed, is able to be adjusted to facilitate the cutting of workpieces of various thicknesses, or to simply adjust the depth of a cut.

The accuracy and variety of cutting applications are enhanced by the following features: a flange perpendicularly extending from the leading edge of the guide fence, an after-cut guide, a filler plate attached to the bottom surface of the base, and a riser plate which can be attached to the surface of the guide fence which engages a workpiece.

The flange creates a right angle at the leading edge of the guide fence thus providing a firm support for the right-angle edges of workpieces which will be cut, and also creating a firm corner of support for workpieces of other configurations.

The after-cut guide engages the workpiece at the trailing end of the guide fence and is attached to the base opposite the guide fence. It helps steady that portion of a workpiece which has passed the bit of the router, particularly those pieces which have been cut at an angle.

When the guide fence is pivoted to the position perpendicular to the base, and the cutting guide and router are used to perform edging, the filler plate, which is the same thickness as the flange, acts to provide a level surface for engagement of the workpiece.

When edging is performed, the riser plate is affixed to the guide and helps serve as a depth guide for the bit. In addition, the riser plate is optimally composed of a material, and is affixed in such a manner, that it will not mar the surface along which it travels.

It is an object of the present invention to provide a cutting guide which will enable users of hand-held routers to make precise, accurate cuts on a workpiece.

It is also an object of the present invention to provide a cutting guide which will enable users of hand-held routers to make precise, accurate cuts on a workpiece at selected angles.

It is also an object of the present invention to provide a cutting guide which will enable users of hand-held routers to precisely and accurately cut splines, dados, shiplaps and rabbets.

It is also an object of the present invention to provide a cutting guide which will enable users of hand-held routers to precisely and accurately cut splines, dados, shiplaps and rabbets at angles.

It is also an object of the present invention to provide a cutting guide which will enable users of hand-held routers to precisely and accurately cut splines, dados, shiplaps and rabbets in the cut surface of workpieces which have been cut at an angle.

It is also an object of the present invention to provide a cutting guide which will enable users of hand-held routers to precisely and accurately perform edging on workpieces.

It is also an object of the present invention to provide a cutting guide which will enable users of hand-held routers to precisely and accurately perform edging on workpieces without maring the surface of the workpiece upon which the cutting guide rests.

It is also an object of the present invention to provide a cutting guide which accomplishes the aforementioned objects on workpieces of varying thicknesses.

It is also an object of the present invention to provide a single cutting guide which is capable of accomplishing all of the above objects.

Other aspects, objects features and advantages of the present invention will become apparent to those skilled in the art upon reading the detailed description of a preferred embodiment in conjunction with the accompanying drawings and appended claims.

DESCRIPTION OF THE DRAWINGS

While the specification concludes with claims particularly pointing out and distinctly claiming the subject matter which is regarded as the present invention, it is believed that the invention will be better understood upon a review of the following description of a preferred embodiment taken in conjunction with the accompanying drawings in which:

DESCRIPTION OF THE PREFERRED EMBODIMENT

Referring now to the drawings in more detail, numeral 10 generally designates a cutting guide constructed in accordance with a preferred embodiment of the present invention. In the figures, each feature is denoted by the same numeral throughout the illustrations.

Figure 1A:
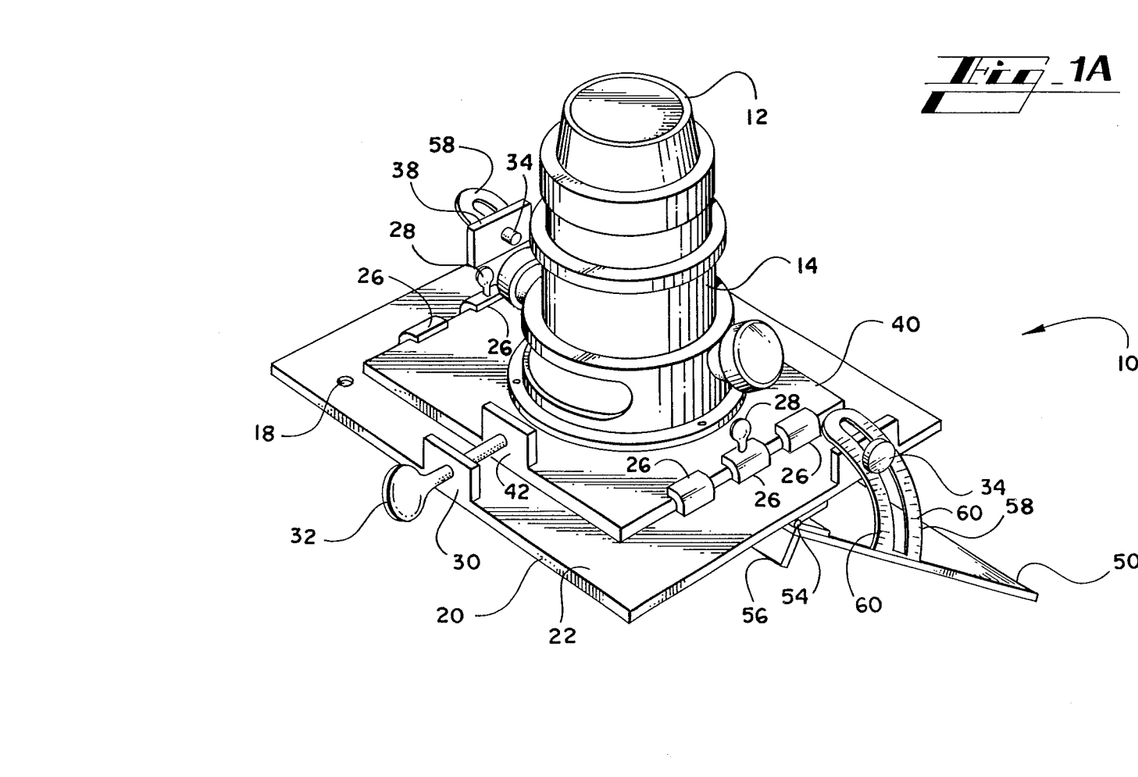
FIG. 1A is a perspective view of the top side of a cutting guide according to a preferred embodiment of the invention, with a router mounted thereon.

Referring generally to FIG. 1A, a router which is essentially comprised of a router motor assembly 12 and a router unit base 14 is mounted upon the mounting plate 40 of a cutting guide according to a preferred embodiment of the invention. The mounting plate 40 is mounted on the top surface 22 of the base 20. The mounting plate 40 is held in position over the base 20 by retaining tabs 26. A thumb screw, the position adjusting screw, 32 extends through the base tab 30 and the mounting plate tab 42. Upon being turned, the position adjusting screw 32 causes the mounting plate 40 to translate across the base 20 between the retaining tabs 26. The mounting plate 40 can be secured in place over the base 20 by tightening the thumb screws 28 which extend through threaded openings 27 in the retaining tabs 26.

The guide fence 50 is attached to the base 20 by hinge 54 and is pivotable about that hinge 54 through selected angles. The fence guide 50 can be secured at selected angles by tightening the screws 34 which extend through the securing tabs 38. The screws 34 are tightened against the arms 58 which are attached to the guide fence 50. The guidefence 50 has a flange 56 which forms a corner at the end of the guidefence 50 which first receives a workpiece.

Still referring to FIG. 1A, the base 20 has fitted thereupon a mounting plate 40. A router is, in turn, mounted upon the mounting plate 40.

Figure 2A:
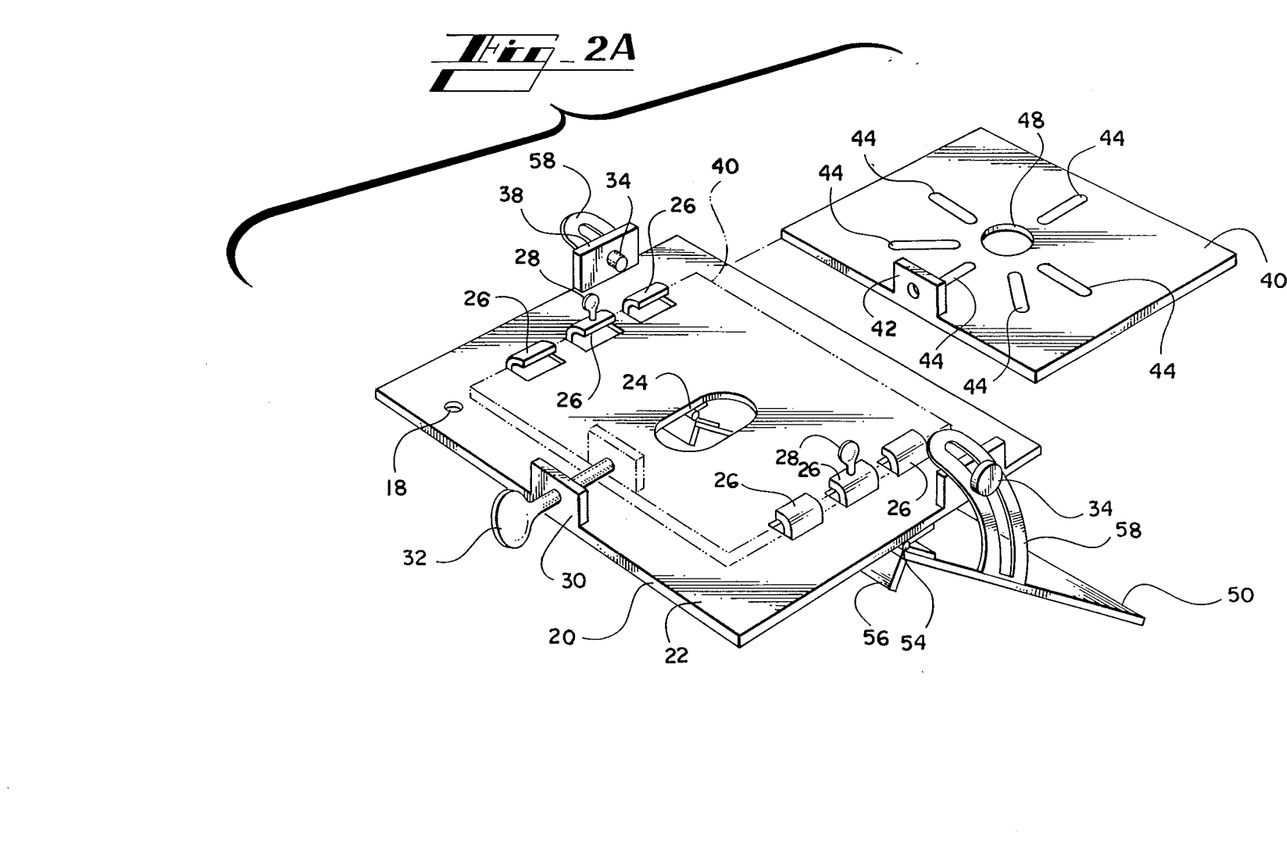
FIG. 2A is a perspective view of the top side of the cutting guide of FIG. 1 with the mounting plate removed.

Referring now to FIG. 2A, the mounting plate 40 has an opening 48 through its center through which the bit of a router may protrude when it is mounted upon the mounting plate 40.

Figures 1B, 1C:
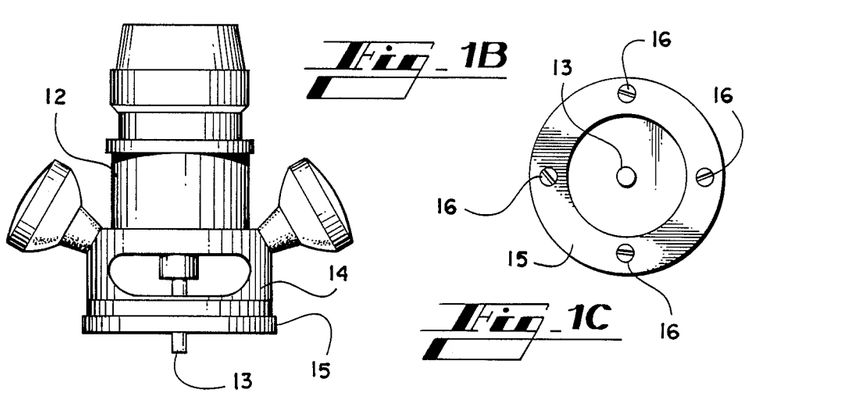
FIG. 1B is a front elevation view of the router shown in FIG. 1A.
FIG. 1C is a bottom plan view of the router of FIG. 1B.

In general, routers can be dismantled into several basic parts as illustrated by FIGS. 1B and 1C. For illustrative purposes, those parts can be referred to as follows: router motor assembly 12, router unit base 14, router unit base plate 15 and router bit 13. The router unit base plate 15 is normally attached to the router unit base 14 by screws 16. Some routers have the router unit base plate 15 attached by three screws 16 spaced 120° apart while others may have four screws 16 spaced 90° apart.

Referring now additionally to FIGS. 1B and 1C, in the embodiment of the invention which is illustrated, the router has a router unit base plate 15 which is attached to the router unit base 14 by four screws 16. To mount the router on the mounting plate 40, the screws 16 and router unit base plate 15 are removed. The screws 16 are used to mount the router unit base 14 upon the mounting plate 40.

Figure 2B:
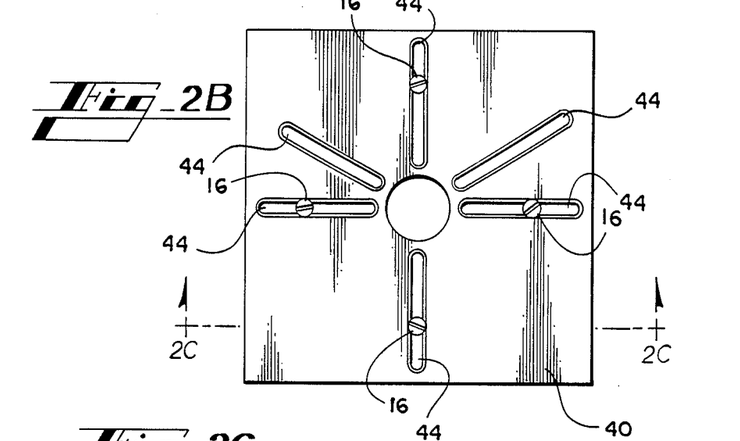
FIG. 2B is a top plan view of the mounting plate of FIG. 2A.
Figures 2C, 2D:
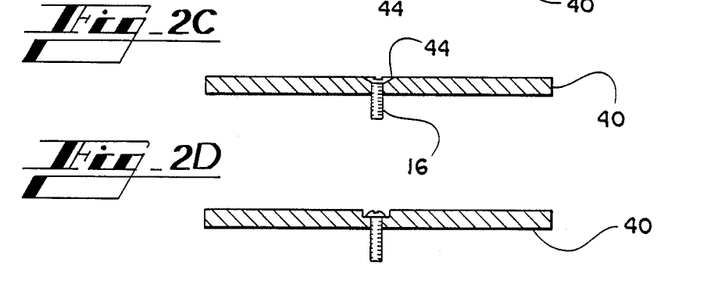
FIG. 2C is a cross-sectional view of the mounting plate of FIG. 2B taken along line 2C.
FIG. 2D is a cross-sectional view of the mounting plate of FIG. 2B taken along line 2C, showing an alternative slot structure.

Also referring now to FIGS. 2B, 2C and 2D, the mounting plate 40 contains slots 44 to facilitate mounting of the router. The screws 16 are placed through the slots 44 to attach the mounting plate 40 to the router unit base 14 in the same manner which the router unit base plate 15 was attached.

Referring now particularly to FIGS. 2B, 2C and 2D, the mounting plate 40 shown has six slots 44 extending radially about the opening 48. The slots 44 are spaced such that four of them lie 90° apart and three lie 120° apart. The six slots 44 make it possible to affix routers whose router unit base plates are attached by four screws as well as those routers whose router unit base plates are attached by three screws.

Again referring particularly to FIGS. 2B, 2C and 2D, slots 44 are bevelled or similarly configured to create a countersunk surface for seating the screws 16. Thus, when fully seated, the heads of the screws 16 are flush with the surface of the mounting plate 40. This enables the mounting plate 40 to fit upon the base 20 and move freely without hinderance from the heads of the screws 16.

Referring again briefly to FIGS. 1A and 2A, once the router unit base 14 is attached to the mounting plate 40, the mounting plate 40 is slid into place onto the base 20 through tabs 26. The router motor assembly 12 may be seated in the router unit base 14 before or after the router unit base 14 is mounted upon the mounting plate 40. The opening 48 through the mounting plate 40 is lined up over the opening 24 of the base 20 so that the router bit 13 of the router is able to freely protrude through both openings. The mounting plate 40 must be slid into place onto the base 20 before the bit 13 is installed. If the motor assembly 12 is fitted into the router unit base 14 before the mounting plate 40 is slid into place, the router bit 13 must be installed afterwards. If the motor assembly 12 will not be fitted into the router unit base 14 until after the mounting plate 40 is slid into place on the base 20, the router bit 13 may be installed prior to fitting the motor assembly 12 into the router unit base 14.

Once the mounting plate 40 has been slid into place, the position adjusting screw 32, after being screwed through the base tab 30, is seated in the mounting plate tab 42. The exact position of the router bit 13 through the base opening 24 can be controlled by the initial seating of the adjusting screw 32 in the mounting plate tab 42 and subsequent turning of the adjusting screw 32. To or fro translational motion of the mounting plate 40 will correspond to respective clockwise or counterclockwise turning of the adjusting screw 32.

Figure 3:
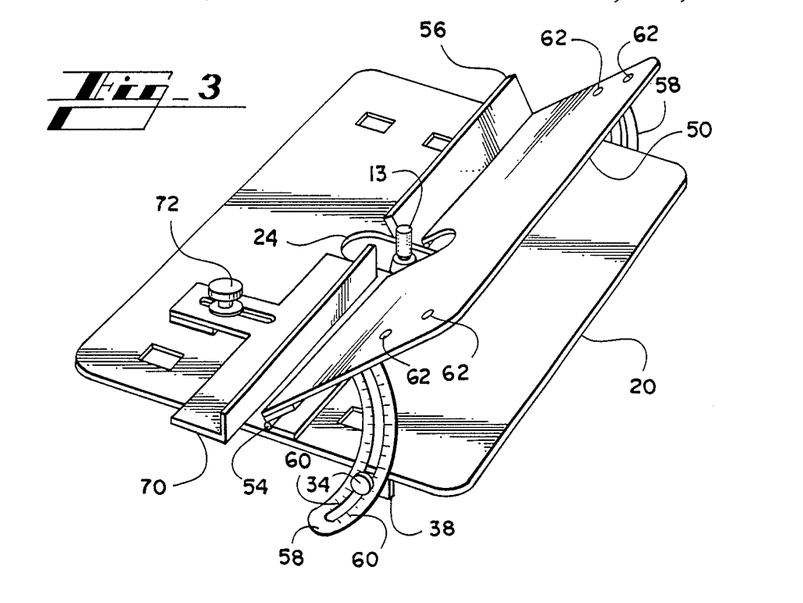
FIG. 3 is a perspective view of the bottom side of the cutting guide of FIG. 1.

Referring particularly now to FIG. 3, the bottom of a cutting guide according to a preferred embodiment of the invention is shown. The guide fence 50 is connected to the bottom surface 46 of the base 20 by the hinge 54, and is pivotable about the hinge 54. The flange 56 which extends perpendicularly from the guide fence 50 forms a right-angle supporting surface for receiving workpieces. The right angle is formed at the end of the guide fence 50 which comes into contact with a workpiece before it is cut by the router bit 13.

In use, the cutting guide 10 is moved along a workpiece with the flanged end of the guide fence 50 engaging the workpiece first. As the guide fence 50 supports the cutting guide 10 and attached router, the cutting guide 50 and router are moved along over the workpiece. The router bit 13 cuts the edge of the workpiece as it is passed over the workpiece. The guide fence 50 rests upon the workpiece and continues to support the cutting guide 10 and router throughout the cutting process, thus helping to facilitate precise, accurate routing.

The after-cut guide 70 provides additional support by engaging a workpiece after it passes the router bit 13.

This is especially helpful when the edge of the workpiece has been bevelled or cut at an angle and would no longer conform to a right-angled receiving surface. The after-cut guide 70 is positioned so that its edge which is perpendicular to the base is aligned with the router bit 13. Thus, when the edge of the workpiece passes the router bit 13, it is closely received by the aftercut guide 70 Engagement of the bevelled edge of a workpiece which has been bevelled is easily achieved because of alignment of the after-cut guide 70 and the router bit 13.

The after-cut guide 70 helps to further ensure precise, accurate routing by providing additional support for the cutting guide 10. The after-cut guide 70 is adjusted by moving it along a line which is perpendicular to the hinge 54 about which the guide fence is pivotable. The after-cut guide 70 is fixed in selected positions by tightening the after-cut guide screw 72. The after-cut guide screw 72 is seatable in the threaded opening of the base 20. The slotted opening 73 of the aftercut guide 70 allows it to be moved toward or away from the guide fence 50 without removal of the after-cut guide screw 72.

It can be seen from FIG. 3 that the guide fence 50 has a notched opening 52 which corresponds to the base opening 24.

As is also shown in FIG. 3, the router bit 13 freely protrudes through both openings. The openings are configured so that the router bit 13 is able to be placed in selected positions along a line perpendicular to the guide fence hinge 54.

As discussed above, fine adjustments in positioning of the router bit 13 can be achieved by turning the position adjusting screw clockwise or counterclockwise, thus causing the mounting plate to translate with the router attached.

Figure 4:
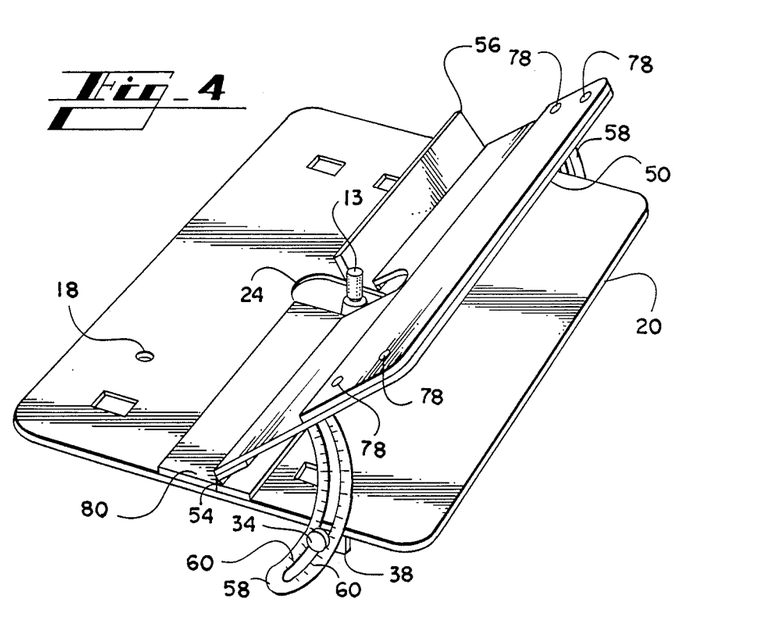
FIG. 4 is a perspective view of the bottom side of the guide fence of FIG. 1 with the after-cut guide removed.
Figure 5A:
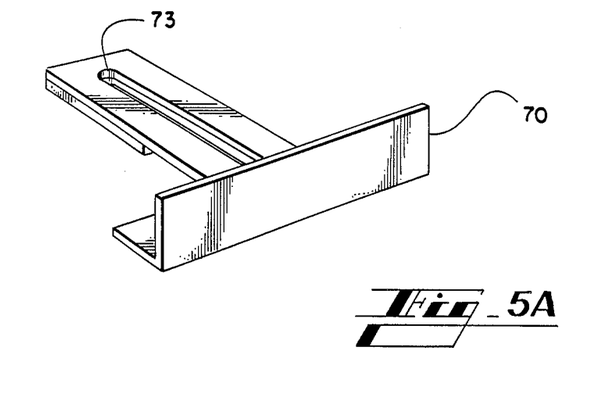
FIG. 5A is a perspective view of the after-cut guide of the cutting guide of FIG. 2A.
Figure 5B:
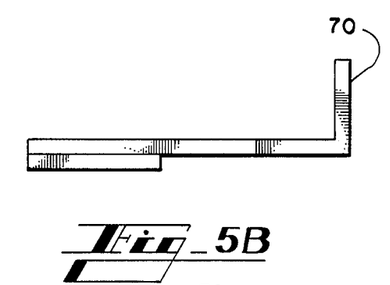
FIG. 5B is a side elevation view of the after-cut guide of FIG. 5A.
Figure 5C:
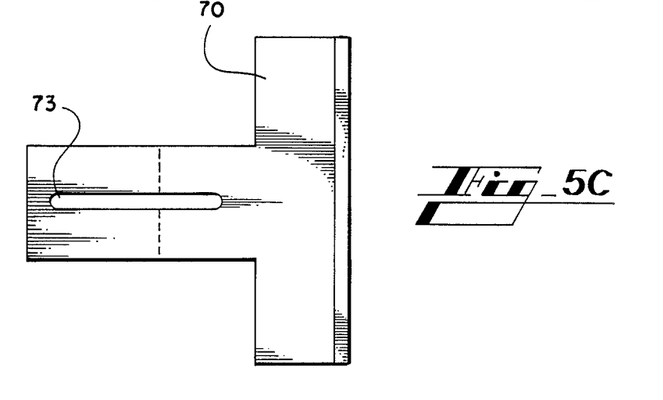
FIG. 5C is a top plan view of the after-cut guide of FIG. 5B.
Figure 5D:
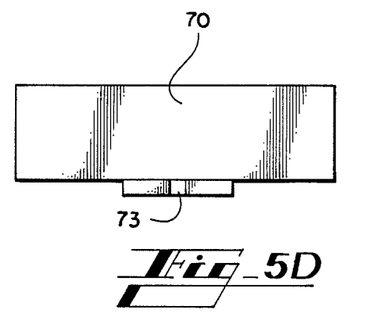
FIG. 5D is a front elevation view of the after-cut guide of FIG. 5C.

Referring now to FIG. 4, the bottom of a cutting guide 10 according to a preferred embodiment of the invention is shown. The after-cut guide shown in FIG. 3 has been removed from the cutting guide 10 revealing the filler plate 80. The filler plate 80 is the same thickness as the flange 56. When the cutting guide 10 is used to perform edging, the after-cut guide is removed and the guide fence 50 is rotated to a position perpendicular to the bottom surface 46 of the base 20. In this position, the flange 56 of the guide fence 50 lies flat upon the bottom surface 46 of the base 20. The filler plate 80 provides a support surface which is level with the flange portion 56 of the guide fence 50.

FIGS. 5A through 5D illustrate the configuration of the after-cut guide 70. The after-cut guide 70 is configured so that the end which is positioned closest to the guide fence and which rests upon the filler plate 80 is elevated above the rearward portion of the after-cut guide 70 which rests upon the base 20. The amount of elevation corresponds to the thickness of the filler plate 80. Thus, the after-cut guide 70 remains level as it is placed in various positions proximate to the guide fence 50.

Figures 6, 7:
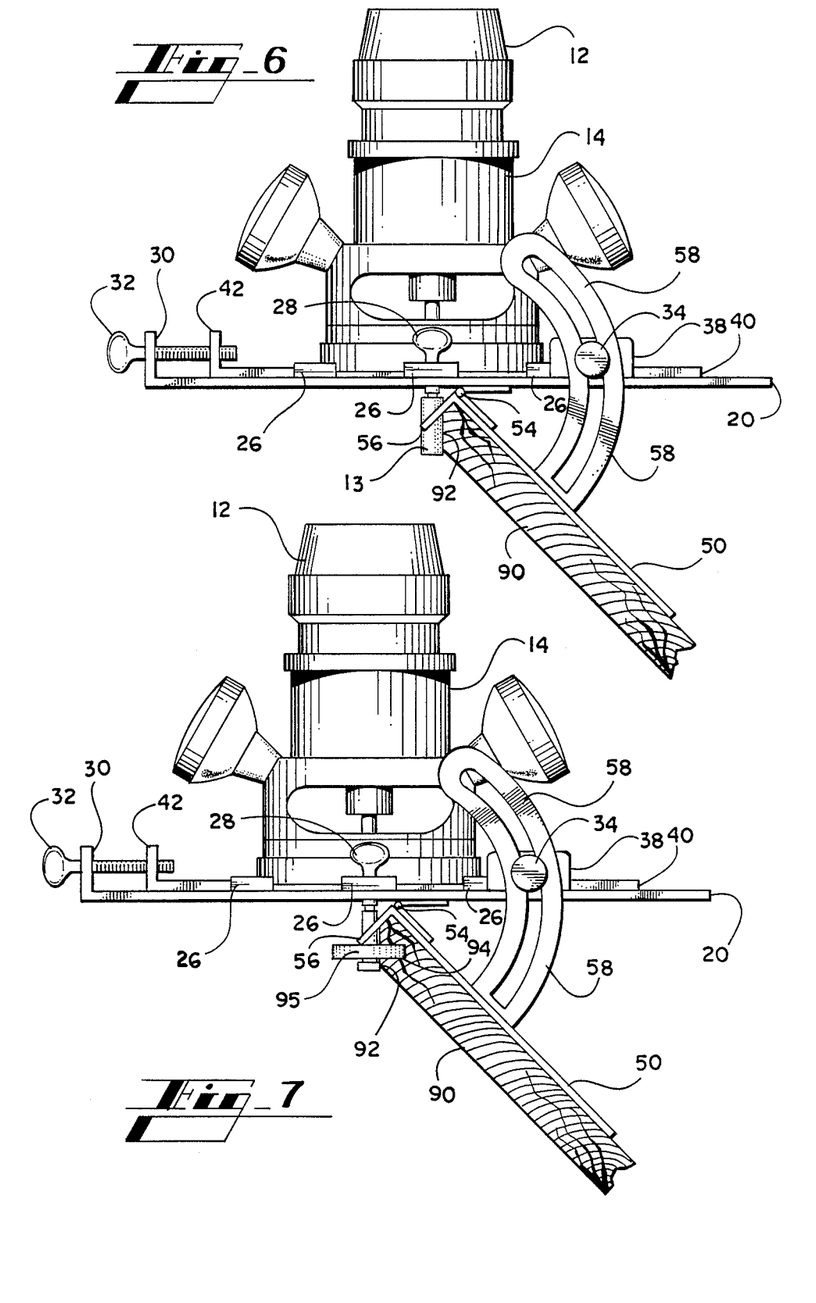
FIG. 6 is an elevation view of a cutting guide according to a preferred embodiment of the invention, with a router affixed thereto, and the bit of the router bevelling the edge of a workpiece.
FIG. 7 is an elevation view of a cutting guide according to a preferred embodiment of the invention, with a router affixed thereto, and a splining bit of the router splining an edge which has been bevelled.

Referring now particularly to FIG. 6, there is illustrated a cutting guide 10 according to a preferred embodiment of the invention as it is used to guide a router which is bevelling the edge of a workpiece. The angle of cut has been set by positioning the guide fence support arm 58 at a selected angular notation 60 and temporarily fixing the guide fence support arm 58 at that position by tightening the screw 34. The routing cut is accomplished by moving the cutting guide 10 in a direction that would be coming out of the plane of the paper upon which FIG. 6 is drawn. As is shown in FIG. 6, the router bit 13 cuts the edge of the workpiece 90 down to the edge 92. The depth of cut can be finely modified by rotating the position adjusting screw 32 clockwise or counterclockwise.

Referring now to FIG. 7, there is illustrated a cutting guide 10 according to a preferred embodiment of the invention as it is used to guide a router which is splining the bevelled edge 92 of the workpiece 90 which was shown being cut in FIG. 6. The guide fence support arm 58 remains fixed at the same angle which was used for bevelling. The splining router bit 95 cuts a spline 94 in the bevelled edge 92 as the cutting guide 10 is moved in a direction out of the plane of the paper. When the cutting guide 10 is used to perform splining in this manner, the spline cut 94 is perpendicular to the bevelled edge 92 of workpiece 90. However, splining can also be performed upon square edges or at any angle upon any edge by adjustment of the angle of cut, which is accomplished by adjusting the position of the guide fence support arm 58. The depth of cut can be finely modified by rotation of the position adjusting screw 32.

Figure 8:
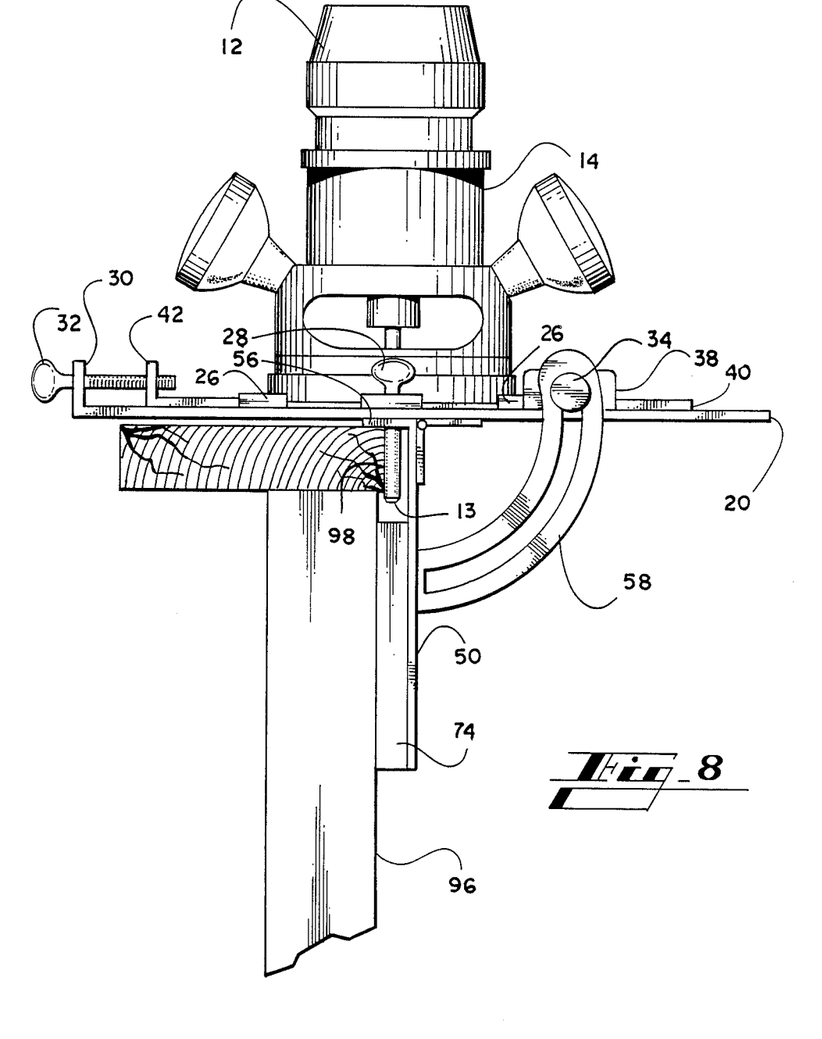
FIG. 8 is an elevation view of a cutting guide according to a preferred embodiment of the invention, with a router affixed thereto, performing an edging function.

Referring now to FIG. 8, there is illustrated a cutting guide 10 according to a preferred embodiment of the invention as it guides a router which is edging a workpiece. Edging is illustrated as it is being performed upon a workpiece which has been formed from two separate workpieces—for example, where a perimeter or edge has been placed around a table surface. In this example, the surface of the table would correspond to the workpiece surface 96 and the perimeter or edge which is to be cut down as near as possible to the surface 96 corresponds to edge workpiece 98.

In FIG. 8, the guide fence 50 has been rotated to a position wherein it is perpendicular to the base 20. The riser plate 74 has been attached to the guide fence 50 and ensures that the router bit 13 maintains a constant cutting depth as it cuts workpiece 98. To prevent the maring of a finished surface 96 upon which the riser plate 74 rests when the cutting guide 10 is being used for edging, the riser plate 74 can be made from a nonabrasive material such as plastic. To further prevent maring, the screws 76 which attach the riser plate 74 to the guide fence 50 fit through countersunk holes 78 in the riser plate 74. Again, the depth of cut can be finely modified by turning the position adjusting screw 32.

As is apparent from the foregoing specifications, the invention is susceptible of being embodied with various alterations and modifications which may differ particularly from those which have been described in the preceding specification and description. Accordingly, the following claims shall cover all such alterations and modifications as do not depart from the true spirit and scope of the invention.

What is claimed is:

1. An accessory for a router having a bit, comprising:
   a base having an opening;
   first means for mounting the router on said base with the bit of the router extending through said opening of said base;
   second means for receiving the workpiece and facilitating alignment of the bit and the workpiece as the workpiece is cut by the bit, said second means including a guide fence defining a guide fence opening therethrough along an edge of said guide fence for allowing projection of the bit of the router; and hinge means for coupling said guide fence to said base along said edge of said guide fence having said opening, and establishing a hinge axis on a surface of said base proximate to said opening of said base, about which said hinge axis said guide fence is pivotable between a horizontal position wherein said guide fence is parallel to said surface of said base and a vertical position wherein said guide fence is perpendicular to said surface of said base.

2. The invention of claim 1, wherein said first means for mounting the router includes means for selectively positioning the bit of the router proximate to the workpiece as the workpiece is received by said guide fence.

3. The invention of claim 1, including an after-cut guide releasably attached to said base for closely receiving a surface of the workpiece after the workpiece has been passed over the bit of the router.

4. The invention of claim 1, including means for preventing the guide fence from maring a finished surface of the workpiece.

5. The invention of claim 4, wherein said means for preventing the guide fence from marring a finished surface of the workpiece comprises a riser plate of non abrasive material removably affixed to a surface of said guide fence which receives said workpiece.

6. The invention of claim 5, wherein said nonabrasive material is plastic.

7. The invention of claim 1, wherein said guide fence has a flange extending perpendicularly therefrom along said edge where said guide fence is coupled by said hinge means to said base.

8. The invention of claim 7, wherein said flange extends along said guide fence from an end of said guide fence which first receives the workpiece to said guide fence opening.

9. The invention of claim 8, further comprising a filler guide fixedly attached to said base along said hinge axis at an end of said guide fence opposite said end of said guide fence which first receives the workpiece.

10. The invention of claim 9, wherein said filler guide comprises a plate having the same thickness a said flange.

11. The invention of claim 1, including releasable means for rigidly maintaining said guide fence in selected positions between said horizontal position and said vertical position.

12. The invention of claim 11, wherein said releasable means comprises:
at least one rigid member having an end fixedly attached to said guide fence; and
releasable lock means for locking at least one said rigid member to said base.

13. An apparatus comprising:
a base having an opening therethrough to allow for extension of a bit of a router;
means for mounting the router on said base with the bit of the router extending through said base;
a guide fence for receiving a workpiece and facilitating alignment of the workpiece and router bit as the workpiece is cut by the router bit; and
hinge means coupling said guide fence to said base, and establishing a hinge axis on a surface of said base proximate to said opening of said base, about which said hinge axis said guide fence is pivotable between a horizontal position wherein said guide fence is parallel to said surface of said base and a vertical position wherein said guide fence is perpendicular to said surface of said base.

14. The invention of claim 13, wherein said means for mounting the router on said base includes means for selectively positioning the bit of the router proximate to the workpiece as the workpiece is received by said guide fence.

15. The invention of claim 13, including releasable means for rigidly maintaining said guide fence in selected positions between said horizontal position and said vertical position.

16. An apparatus comprising:
a plate base having a top surface and a bottom surface, and defining an opening;
means for mounting a router having a bit on said top surface of said plate base with the router bit projecting through said opening of said plate base perpendicular to said bottom surface of said plate base, said means for mounting having means for selectively positioning said router bit along a line perpendicular to a direction which the router bit will move across a workpiece;
a guide fence for receiving the workpiece and facilitating alignment of the router bit and the workpiece as the workpiece is cut by the router bit, said guide fence defining a slotted opening for allowing extension of the router bit through said guide fence, said guide fence having a flange extending perpendicularly therefrom along an edge from an end of said guide fence to said slotted opening;
hinge means coupling said edge of said guide fence having said flange extending therefrom to said bottom surface of said plate base, establishing a hinge axis on said bottom surface of said plate base proximate to said opening of said base, about which said hinge axis said guide fence is pivotable between a horizontal position wherein said guide fence is parallel to said bottom surface of said plate base and a vertical position wherein said guide fence is perpendicular to said bottom surface of said plate base;
an after-cut guide releasably attached to said bottom surface of said plate base, for closely receiving a surface of the workpiece which has been cut at an angle;
releasable means for rigidly maintaining said guide fence in selected positions between said horizontal position and said vertical position; and
a filler plate having the same thickness as said flange, fixedly attached to said bottom surface of said plate base along said hinge axis at an end of said guide fence opposite said end of said guide fence which first receives the work piece.

* * * * *